(12) United States Patent
Wu et al.

(10) Patent No.: US 7,697,469 B2
(45) Date of Patent: Apr. 13, 2010

(54) METHOD AND APPARATUS TO IMPROVE COMMUNICATION PERFORMANCE IN ARQ NETWORKS

(75) Inventors: Tao Wu, Carlsbad, CA (US); Wanshi Chen, San Diego, CA (US); Young Yoon, San Diego, CA (US); Jonas Wiorek, San Diego, CA (US); Anthony C. K. Soong, Superior, CO (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1420 days.

(21) Appl. No.: 11/018,773

(22) Filed: Dec. 21, 2004

(65) Prior Publication Data

US 2006/0133268 A1 Jun. 22, 2006

Related U.S. Application Data

(60) Provisional application No. 60/570,392, filed on May 12, 2004.

(51) Int. Cl.
   *H04J 3/16* (2006.01)
(52) U.S. Cl. ............... 370/328; 370/338; 370/468
(58) Field of Classification Search ............ 370/468, 370/328, 338
   See application file for complete search history.

(56) References Cited

U.S. PATENT DOCUMENTS

| | | | |
|---|---|---|---|
| 6,760,303 B1 * | 7/2004 | Brouwer | 370/229 |
| 2002/0028691 A1 | 3/2002 | Moulsley et al. | |
| 2002/0080719 A1 * | 6/2002 | Parkvall et al. | 370/235 |
| 2003/0039227 A1 * | 2/2003 | Kwak | 370/330 |
| 2003/0103483 A1 * | 6/2003 | Joshi et al. | 370/338 |
| 2003/0134642 A1 * | 7/2003 | Kostic et al. | 455/450 |
| 2004/0001456 A1 * | 1/2004 | Chao | 370/328 |
| 2004/0259559 A1 | 12/2004 | Li et al. | |
| 2005/0030964 A1 * | 2/2005 | Tiedemann et al. | 370/431 |
| 2005/0186983 A1 * | 8/2005 | Iochi | 455/522 |
| 2006/0133268 A1 * | 6/2006 | Wu et al. | 370/229 |

FOREIGN PATENT DOCUMENTS

WO    WO 02/082685    10/2002

OTHER PUBLICATIONS

Fairhurst et al, IETF RFC 3366, "Advice to link designers on link Automatic Repeat reQuest (ARQ)", Aug. 2002.*

* cited by examiner

*Primary Examiner*—Seema S Rao
*Assistant Examiner*—Jianye Wu
(74) *Attorney, Agent, or Firm*—Coats & Bennett, P.L.L.C.

(57) ABSTRACT

A wireless communication network improves reverse link communication performance by changing one or more Automatic Repeat Request (ARQ) control settings as a function of measured or estimated reverse link loading. Control settings can be changed on a per-sector basis, allowing consideration of different loading conditions in different radio sectors of the network. Further, control settings can be changed for individual mobile stations, or selected groups of mobile stations, allowing different ARQ controls to be used for different mobile stations. By way of non-limiting example, a control circuit in a base station controller can be configured to take advantage of light reverse link loading conditions in a given radio sector by changing the ARQ control parameter(s) used for one or more mobile stations operating in that sector so that fewer ARQ retransmissions are required for those mobile stations to transmit reverse link data to the network.

28 Claims, 2 Drawing Sheets

METHOD AND APPARATUS TO IMPROVE COMMUNICATION PERFORMANCE IN ARQ NETWORKS

RELATED APPLICATIONS

This application claims priority under 35 U.S.C. §119(e) from the U.S. provisional patent application entitled, "Methodology for Enhancing Packet Data Performance of a Lightly Loaded Cellular System," which was filed on 12 May 2004, and which is assigned Application Ser. No. 60/570,392.

BACKGROUND OF THE INVENTION

The present invention generally relates to wireless communication networks, and particularly relates to improving communication performance in wireless communication networks employing Automatic Repeat Request (ARQ) retransmission mechanisms, such as the Hybrid ARQ (H-ARQ) mechanism used in cdma2000-based wireless communication networks.

Limiting per-user interference levels in wireless communication networks employing Code Division Multiple Access (CDMA) increases the number of users that can be supported simultaneously, and improves reception conditions for all users. Maintaining each user's reverse link transmit power to a minimum level needed for satisfactory communication performance stands as a primary limiting mechanism, and CDMA-based networks commonly rely on so-called outer-loop and inner-loop power controls to control the transmit power used on various forward and reverse link radio channels.

As an example, the reverse link data signal from a given user (mobile station) is received at a network base station and its received signal strength is compared to an outer loop power control target. If the signal strength is above the target, the base station sends a "down" command to the user, or sends an "up" command if the signal strength is below the target. The comparisons and up/down command transmissions occur at a defined inner loop power control rate, which usually is many times per second. The outer loop control target usually is adjusted at some slower outer loop power control rate based on a measured or estimated Frame Error Rate (FER) determined for the received signal.

Applying ARQ mechanisms within the above context offers the opportunity to further minimize each user's transmit power. For example, recent revisions of the IS-2000 standards for CDMA2000 wireless communication networks introduced higher-rate reverse link packet data channels employing H-ARQ. A data transmission based on H-ARQ comprises whatever number of transmissions of a given data packet are needed for successful receipt, but usually subject to some limit on the number of retransmissions. More particularly, the H-ARQ method adopted for the Reverse Packet Data Channels (R-PDCHs) used in later revisions of the IS-2000 standards use multiple transmissions that yield gradually decreasing statistical reception error rates.

For example, a H-ARQ control mechanism may define a three-try transmission sequence having an ending or cumulative target FER of 1%. A given data packet (or sub packet) might be transmitted from a mobile station according to a three-try ARQ transmission sequence that uses different target FERs for the different subpacket transmissions in the sequence, such that the overall FER for all subpackets terminated at the first, second, or third ARQ transmissions is 1%. (Other FER calculations can be used, of course.) Generally the FER target used for the first and/or second subpackets is higher with the advantage being that the target signal strengths required for these transmissions are relatively low compared to a non-ARQ single transmission target of 1%. Thus, to the extent that the second or third transmissions in the defined ARQ transmission sequence are not always needed for successful data reception, the overall transmit power of the mobile station can be kept lower than would be needed absent the use of ARQ.

The use of ARQ carries with it certain disadvantages as well. For example, because high FERs and/or lower transmit power typically are used at least for the initial sub packet transmission by a mobile station, the likelihood is that the transmission will not be received correctly, requiring one or more retransmissions of that same data. Transmitting the same data multiple times lowers the effective reverse link data rate. Indeed, an average of 2.2 ARQ transmissions per sub packet have been observed for CDMA2000 systems in exemplary simulation environments, meaning that a peak data rate of 1.8 Mbps more typically yields a lower effective data rate of about 818 Kbps (1.8 Mbps/2.2 transmissions).

SUMMARY OF THE INVENTION

The present invention comprises a method and apparatus for improving reverse link communication performance in a wireless communication network based on changing one or more of the control settings used by the network for Automatic Repeat Request (ARQ) control of reverse link data transmissions by one or more mobile stations as a function of reverse link loading conditions. In particular, the ARQ control for one or more mobile stations in a given radio sector of the network can be changed dynamically responsive to detecting reverse link loading conditions in that sector. For example, in response to detecting light reverse link loading conditions, the ARQ control can be changed to cause the mobile station(s) generally to transmit with higher power earlier in a defined ARQ transmission sequence, since reverse link interference is not particularly problematic at such times. The control change effectively amounts to reducing the average number of ARQ retransmissions needed by a given mobile station responsive to detecting a light reverse link loading condition.

Thus, in one embodiment, a method of improving reverse link communication performance in a wireless communication network that uses reverse link ARQ control comprises detecting a reverse link loading condition as lightly loaded or normally loaded, and configuring the ARQ control used for one or more mobile stations according to first ARQ control settings during the normally loaded condition and according to second ARQ control settings during the lightly loaded condition. The second ARQ control settings are configured to reduce ARQ retransmissions by the mobile station(s) during the lightly loaded condition. The second control settings may comprise the first control settings with one or more changed or updated values, such as changed reverse link power control targets, changed reverse link power control step sizes, changed reverse link Frame Error Rate (FER) targets, or changed reverse link FER calculations.

A base station control circuit can be configured to carry out the above method, or variations of that method. In one embodiment, the base station control circuit comprises one or more processing circuits that are configured to detect a reverse link loading condition as lightly loaded or normally loaded, and configure the ARQ control for the one or more mobile stations according to first ARQ control settings during the normally loaded condition and according to second ARQ control settings during the lightly loaded condition. The processing circuit(s) may comprise hardware, software, or any combination thereof. Thus, a base station controller may be configured to include a circuit that changes the ARQ control settings used in one or more associated radio sectors as a function of estimated or measured reverse link loading conditions in those radio sectors.

One or more additional embodiments extend the above method by detecting multiple loading conditions, and using different ARQ control settings for the multiple, different loading conditions. For example, the base station control circuit may comprise a loading detection circuit that is configured to detect the reverse link loading condition as normally loaded, lightly loaded, or very lightly loaded by comparing an estimate of reverse link loading to two or more defined loading thresholds. A loading estimation circuit can be included in the base station control circuit, or associated with it, to generate the reverse link loading estimates. Generation of the estimates can be based on counting the number of mobile stations associated with one or more services in a given radio sector, for example, or they can be based on more sophisticated Signal-to-Noise-plus-Interference-Ratio (SNIR) calculations, or other expressions that yield information about the reverse link load for a given radio coverage area. Further, the threshold used for controlling or triggering an ARQ control change may be based on, or modified by, the Quality-of-Service (QoS) requirements of one or more user's traffic.

Regardless of its implementation details, which can be varied as needed or desired, the present invention broadly contemplates changing one or more ARQ control settings as a function of detected (estimated or measured) reverse link loading conditions and/or the type(s) of load, so that, at least during light loading conditions, the number of ARQ retransmissions needed by one or more mobile stations is reduced. Those skilled in the art will therefore recognize features and advantages in addition to those described above upon reading the following detailed description, and upon viewing the accompanying drawings.

DETAILED DESCRIPTION OF THE INVENTION

Figure 1:
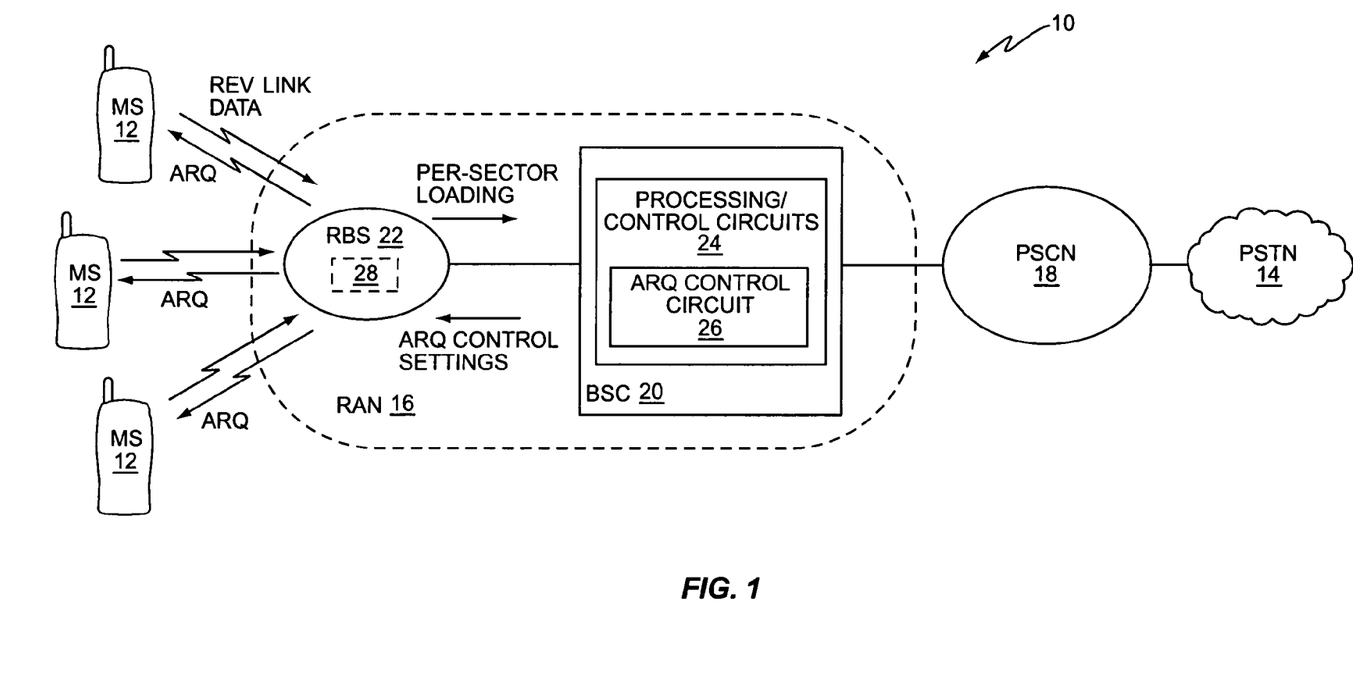
FIG. 1 is a block diagram of a wireless communication network, which, by way of non-limiting examples, may comprise a cdma2000-based cellular communication network or a Wideband CDMA (W-CDMA) cellular communication network.

FIG. 1 is a diagram of a wireless communication network 10 that communicatively couples mobile stations 12 to a Public Data Network (PDN) 14, such as the Internet. The network 10 can comprise a cellular communication network configured according to cdma2000 standards or W-CDMA standards, for example. However, the network 10 is not limited to one of those implementations, and can comprise essentially any type of wireless communication network that controls reverse link transmissions by one or more of the mobile stations 12 using a form of Automatic Repeat Request (ARQ) control.

The Hybrid ARQ (H-ARQ) control used by cdma2000 base stations for controlling packet data transmissions by mobile stations transmitting on Reverse Packet Data Channels (R-PDCHs) stands as one example of an ARQ control that can be "adjusted" to improve reverse link communication performance, particularly during light reverse link loading conditions. By way of non-limiting example, the improvement may comprise an increase in the effective reverse link data rate of one or more of the mobile stations 12.

Returning to the illustration, the network 10 comprises a Radio Access Network (RAN) 16 and a Packet Switched Core Network (PSCN) 18 that is communicatively coupled to the PDN 14. Those skilled in the art will appreciate that FIG. 1 is simplified for this discussion and that the network 10 actually may comprise additional entities not shown.

With that point in mind, the RAN 16 is of particular interest in one or more embodiments of the network 10 wherein one or more ARQ control settings are adjusted as a function of detected reverse link loading conditions. As illustrated, RAN 16 comprises a Base Station Controller (BSC) 20 and an associated Radio Base Station (RBS) 22. Note that the BSC 20 is capable of controlling multiple RBSs 22 in a typical configuration, and that each such RBS 22 may be "sectorized," wherein the RBS 22 provides forward and reverse radio links in each of a defined number of radio sectors.

In one or more embodiments, the BSC 20 comprises processing and control circuits 24 that may be based on hardware or software, or any combination thereof. Similarly, the RBS 22 comprises processing, control, and radio transceiver circuits, and includes a load estimation circuit 28 in one or more embodiments, which is configured to provide estimates (or measurements) of reverse link loading conditions at the RBS's radio receivers. The loading condition information can be sent to the BSC 20 as needed, on demand, or periodically, and can include sector-specific reverse link loading condition information to support per-sector ARQ control adjustment by the BSC 20, for example.

The processing/control circuits 24 include one or more processing circuits configured to operate as an ARQ control circuit that provides at least some aspects of ARQ control adjustment in one or more embodiments. Such processing circuits may comprise at least one microprocessor-based circuit executing stored program instructions implementing desired ARQ control adjustments responsive to detected reverse link loading conditions. Thus, in at least one embodiment, the load estimation circuit 28 of the RBS 22 is configured to provide the ARQ control circuit 26 of the BSC 20 with estimates of reverse link loading conditions for at least one radio sector of the RBS 22 and, in turn, the ARQ control circuit 26 is configured to adjust one or more of the ARQ control settings used by the RBS 22 for ARQ control in the at least one radio sector.

Thus, ARQ control can be adjusted dynamically responsive to changing reverse link loading conditions, wherein the BSC 20 detects such changes based on per-sector loading reports from the RBS 22, while the RBS 22 retains actual ARQ control of the reverse link transmissions by one or more of the mobile stations 12 using ARQ control settings that can be adjusted by the BSC 20 responsive to the detected changes in reverse link loading. This arrangement permits the RBS 22 to retain immediate ARQ control of the mobile stations' reverse link data transmissions, which may comprise sub packets transmitted on 1.25 ms intervals, for example. In other words, the BSC 20 can change one or more ARQ control settings and the RBS 22 can then carry out high-rate ARQ control using the changed settings.

Figure 2:
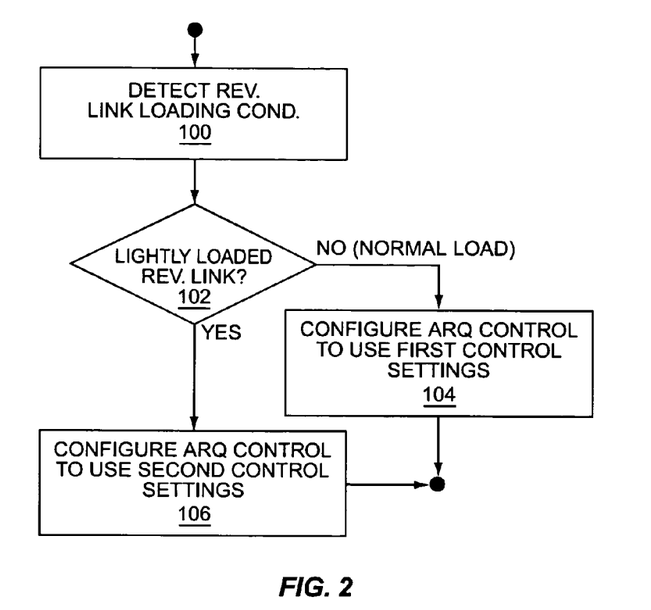
FIG. 2 is a logic flow diagram of processing logic implementing one or more embodiments of ARQ control adjustments based on reverse link loading conditions.

FIG. 2 illustrates one embodiment of ARQ control adjustment, and it should be understood that such processing could be carried out for each sector of the RBS 22, or for each sector of multiple RBSs 22 operating under control of the BSC 20. Processing "begins" detecting reverse link loading conditions for a given radio sector of the network 10 (Step 100). As noted, such detection can be carried out by the ARQ control circuit 26 of the BSC 20, based on per-sector loading information sent to the BSC 20 by the RBS 22.

Reported loading information can be compared to one or more defined loading thresholds to determine a quantized expression of reverse link loading conditions that, in one embodiment, comprise determining whether the given sector's reverse link is lightly loaded (i.e., below a defined loading threshold) or normally loaded (i.e., above the same threshold or above another defined threshold) (Step 102). In one or more embodiments, the "lightly loaded" and "normally loaded" thresholds can be separated by a defined margin to impose hysteretic control for the loading determination to prevent overly frequent changes in the loading condition determination. Alternatively, a single light-versus normal loading threshold can be used and hysteretic control can be incorporated into the loading level comparison logic of the ARQ control circuit 26, for example.

If the reverse link loading condition corresponds to the normally loaded condition, the ARQ control circuit 26 configures the ARQ control used by the RBS 22 for the radio sector of interest to use first ARQ control settings (Step 104). On the other hand, if the reverse link loading condition corresponds to the lightly loaded condition, the ARQ control circuit 26 configures the ARQ control to use second ARQ control settings. As used herein, the terms "first ARQ control settings" and "second ARQ control settings" may be used to refer to the same set of one or more ARQ control values, parameters, calculations, etc., but indicate that one or more such parameters, values, calculations, etc. is changed. In any case, the BSC 20 sends one or more messages to the RBS 22 to effect changes in the RBS's ARQ control behavior responsive to changing reverse link loading conditions at the RBS 22.

Figure 3:
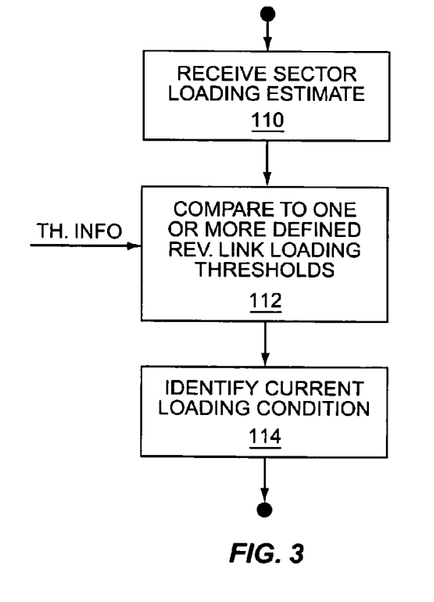
FIG. 3 is a logic flow diagram of processing logic implementing a loading evaluation function supporting the processing logic of FIG. 2, for example.
Figure 4:
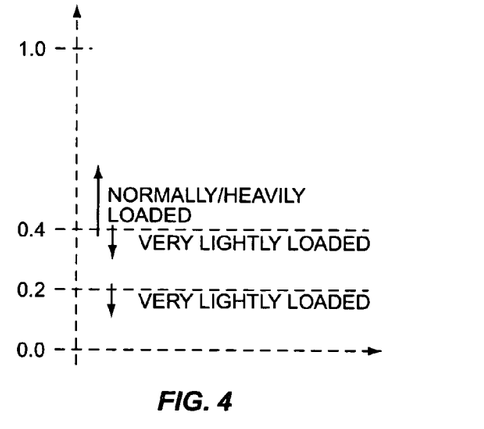
FIG. 4 is a diagram of multiple defined loading thresholds based on a normalized reverse link loading scale, which may be used by the processing logic of FIG. 3, for example.

FIGS. 3 and 4 provide additional processing details for reverse link loading detection in one or more embodiments. Specifically, FIG. 3 illustrates an embodiment of reverse link loading detection based on receiving one or more sector loading estimates (e.g., loading reports from the RBS 22, which may express reverse link loading as a calculated value) (Step 110). Using defined threshold information, which may be set by the equipment manufacturer, or provisioned by the network operator, or adapted dynamically during operation, the sector loading estimates are compared to one or more defined loading thresholds (Step 112), and the current loading condition is identified according to the comparison (Step 114).

FIG. 4 illustrates the use of a normalized reverse link loading scale in one or more embodiments, wherein sector loading estimates are normalized to a defined scale of 0-to-1, for example. By way of non-limiting example, a normalized reverse link loading value of 0.4 or less corresponds to the lightly loaded condition, and a value of 0.2 or less corresponds to a very lightly loaded condition. Conversely, a value greater than 0.4 corresponds to a normally (or heavily) loaded condition.

Thus, multiple thresholds can be used to define a plurality of quantized loading conditions and the ARQ control can be adjusted for all or selected ones of the various loading conditions. The use of one, two, or more thresholds to determine quantized loading conditions represents just one of the numerous variations contemplated herein. Of course, there is a range of variations for adjusting the ARQ control as a function of reverse link loading conditions.

As identified herein, a light reverse link loading condition represents one circumstance where the interference-reducing benefits of ARQ control may not be worth the reduction in effective data rate that attends the use of ARQ control—i.e., the need for repeated transmissions by the mobile stations 12 of the same data under the network's ARQ control reduces the effective data rate of their reverse link transmissions. Thus, at times when a base station (e.g., BSC 20/RBS 22) is supporting a relatively small number of mobile stations 12 on the reverse link—or at least a small number of potentially high-interference mobile stations 12—it is considered to be in a lightly loaded condition.

In such conditions, significant improvements in per-mobile station throughput and packet delay performance can be achieved if the average number of transmissions in the ARQ control process are changed as a function of the reverse link load encountered in a given radio sector. A smaller average number of ARQ retransmissions by a particular mobile station 12 will increase its data throughput and decrease its packet delay, and the additional interference caused by altering ARQ control applied to the mobile station 12 typically will not be significant while the light loading condition persists.

The desired reduction in the number of ARQ retransmissions by the mobile station 12 can be achieved by linking the base station's reverse link power control process to its reverse link scheduling process. That link can be realized by dynamically changing the ARQ control used by the base station as a function of reverse link loading. For example, when scheduling reverse link transmissions by a mobile station 12 in a lightly loaded system, the BSC 20 can change the target set point of the outer loop reverse link power control process to raise the transmitted power of the mobile station 12 so that most, e.g., 99%, of the time packets transmitted by the mobile station 12 are successfully received by the network 10 on their first transmission.

Those skilled in the art will appreciate that the reverse link transmissions by a particular mobile station 12 generally are power-controlled by the network 10 using an inner/outer loop power control process. The fast inner loop power control process generally runs at the RBS-level and generates up/down power control commands for transmission to the mobile station 12 based on comparing the signal strength of the mobile station's reverse link signal as received at the RBS 22 to a target set point. The comparison/command-generation process may run at 800 Hz, for example. In turn, the outer-loop power control process runs more slowly and may be managed at the BSC-level. Outer-loop power control evaluates the appropriateness of the power control target set point being used by the inner-loop power control process. For example, if the Frame Error Rate (FER) of for data received from the mobile station 12 exceeds a desired FER target value—e.g., 1%—the outer-loop power control process raises the inner-loop power control target set point, thereby causing the RBS 22 to drive up the mobile station's transmit power. Conversely, if data is received with an FER below the target, the outer-loop power control process lowers the target set point, thereby causing the RBS 22 to drive down the mobile station's transmit power.

Since the inner power control loop is very fast, e.g., up to 800 Hz for cdma2000 Rev D, the ARQ control used in the corresponding radio sector can quickly change the average number of transmissions in the ARQ sequence as the sector load changes. The consequence of this is that the delay associated with each packet transmitted by the mobile station 12 is reduced significantly. Reducing those delays increases the Transport Control Protocol (TCP) throughput experienced by the packet data application(s) running on the mobile station 12 and potentially yields significant increases in the effective TCP throughput enjoyed by the mobile station 12.

To manipulate or otherwise dynamically change the ARQ control to adjust the (average) number of ARQ transmissions needed by a given mobile station 12 based on inner loop power control target set point adjustment, there are a number of factors to consider. For example, one must consider when to make the target set point adjustment relative to the sub packet transmissions in the defined ARQ sequence. Thus, if the ARQ control defines a three-try transmission sequence that calls out up to three transmissions of a given sub packet, one must decide whether the target set point will be adjusted on the first transmission, the second transmission, or the third transmission, or on some combination of the ARQ transmissions in the defined sequence. Another point to consider is how much the target set point should be changed when it is adjusted. The amount of change can be set based on setting the outer loop power control step size as well as the target FER.

Under these considerations, a generalized algorithm for outer loop power control for dynamically adjusted ARQ control is described below. By way of non-limiting example, the method can be applied to the H-ARQ controls used by cdma2000 wireless communication networks. Regardless, the below embodiment provides flexible control of the inner loop power control target set point for one or more mobile stations 12, either jointly or independently, to directly affect the average number of ARO transmissions needed by the mobile station(s) 12.

The method may be based on a number of assumptions, including these items:

The maximum number of ARQ transmissions in the defined ARQ transmission sequence is three (i.e., three sub packet transmissions comprise the defined ARQ sequence), which is used for the reverse link in Revision D of the cdma2000 standards;

The up step size for the conventional outer loop power control is denoted as "OLS" (typically 0.5 dB), in which a set point increase is linked with (triggered by) the last sub packet reception in the defined ARQ transmission sequence—let $S1+S2+S3=OLS$, where $S1$, $S2$ and $S3$ denote the outer loop power control up step sizes after each sub packet reception in a three-try ARQ transmission sequence;

The target FERs (packet Frame Error Rates) for the three sub packets are $p1$, $p2$ and $p3$ respectively, where $p1 > p2 > p3$ and $p3$ is typically expected to be 1%.

With these assumptions, the method includes these steps:

After the first sub packet reception:
If the reverse packet can not be received successfully, the set point goes up $S1$;
Otherwise, the set point goes down $S1*p1/(1-p1)$;
After the second sub packet reception:
If the reverse packet can not be received successfully, the set point goes up $S2$;
Otherwise, the set point goes down $S2*p2/(1-p2)$;
After the third sub packet reception:
If the reverse packet can not be received successfully, the set point goes up $S3$;
Otherwise, the set point goes down $S3*p3/(1-p3)$.

The above ARQ control settings can be easily set by the BSC 20 to meet different scenarios. For example, a conventional approach might set $S1=S2=0$, $S3=OLS$ and $p3=1\%$.

The outer loop power control (OLPC) process thus reacts to frame erasures only on the third sub packet in the defined ARQ transmission sequence, since reverse link interference and not the effective reverse link data rate represented the primary concern. In contrast, the method herein capitalizes on the reduced concern posed by reverse link interference in light loading conditions and, for a lightly loaded condition, the BSC 20 can $S1=S3=0$, and set $S2=OLS$ and $p2=1\%$ on the ARQ control used for one or more particular mobile stations 12.

Thus, the sub packet used to trigger the target set point changed was changed from the third to the second, and the FER target(s) also were changed, so that a better (lower) FER target was set for the second transmission in the defined ARQ sequence. Such changes cause the mobile station 12 generally to transmit with a higher power earlier in the ARQ sequence, thus reducing the average number of ARQ retransmissions needed and improving the effective reverse link throughput of the mobile station(s) 12. Note that the overall packet FER will be less than 1%.

The method can be extended to very lightly loaded reverse link conditions. For example, the ARQ control settings can be changed dynamically responsive to detecting a very light reverse link loading condition in a given radio sector by setting $S2=S3=0$, and setting $S1=OLS$ and $p1=1\%$ for the ARQ control used for particular mobile stations 12. Doing so links the target set point adjustment to the first sub packet in the ARQ transmission sequence, and changes the FER target for the first sub packet to 1%. This is an even more aggressive setting than that described immediately above, which shifted the target set point trigger to the second sub packet. As before, the overall packet FER will be less than 1%.

In another embodiment, the ARQ control settings can be changed dynamically responsive to detecting light loading conditions by setting $S1=S2=S3=OLS/3$ for particular mobile stations 12, and carefully choosing the target FERs for each sub packet in the defined ARQ transmission sequence, e.g., $p1=50\%$, $p2=10\%$ and $p3=1\%$. Under such settings, the OLPC process reacts gracefully to frame erasures, thereby achieving efficient power control.

Thus, increasing the value of OLS reduces the average number of ARQ transmissions for the mobile station(s) 12 subject to that ARQ control setting change. The OLPC also can be decoupled over the sub packets defined in the ARQ transmission sequence. For example, independent outer loop power controls can be defined and they may use different target set points running on the respective sub packets in the defined ARQ transmission sequence. For a three-try ARQ transmission sequence, the independent target set point controls can run on respective ones of the three sub packets with parameters $S1$, $S2$, $S3$ and $p1$, $p2$, $p3$ appropriately chosen.

The methods contemplated herein, including the embodiments described immediately above, do not exclude soft handoff processing for the mobile stations 12 operating under adjustable ARQ control. For example, if all the sectors in a given mobile station's active set of serving and candidate serving sectors are lightly loaded, the ARQ control can be adjusted in each sector. Conversely, if one or more of the sectors is normally (or heavily) loaded, a normal ARQ control setting can be maintained for the mobile station 12 in that sector, which effectively overrides the more modified ARQ controls that may have been configured in the lightly loaded sectors, since the mobile station 12 typically uses a "OR-OF-THE-DOWNS" control logic to respond to the different power control commands it receives from the different radio sectors.

From the above method variations, those skilled in the art will appreciate that the ARQ control used by the network for one or more mobile stations 12 can be adjusted dynamically to take advantage of light reverse link loading conditions. That is, under such conditions, one or more ARQ control settings can be adjusted, so that the mobile station(s) 12 generally transmit with higher power earlier in the defined ARQ transmission sequence than they would absent the ARQ control adjustment, and thereby reduce their average number of ARQ retransmissions for improved reverse link data throughput. The control setting changes may comprise, but are not limited to, changing which ARQ transmission(s) in the defined ARQ transmission sequence triggers the power control target set point adjustment, changing the FER targets for one or more of the transmissions in the defined sequence, changing the manner in which the FER is calculated over the transmissions in the defined sequence, changing the target set point adjustment step sizes, etc.

Those skilled in the art thus will appreciate that the present invention broadly comprises a method of adjusting ARQ control responsive to detected reverse link loading conditions. "Loading conditions" in this context encompasses the "level" of reverse link loading, and/or the nature of reverse link loading. For example, evaluating a given radio sector's reverse link loading condition can be based on one or more metrics associated with the level of loading, e.g., number of users, and/or can be based on one or more metrics associated with the nature of loading in the sector, e.g., the QoS constraints associated with the sector's reverse link traffic.

Regardless of the particular metric or metrics used to assess reverse link loading conditions, the present invention provides a method of dynamically adjusting the ARQ control used for one or more mobile stations in a given network sector responsive to changing reverse link loading conditions (i.e., load level, traffic QoS requirements, etc.). For example, the network may consider a normalized loading condition of 0.3 to be a "lightly" loaded condition if the reverse link traffic for the mobile stations of interest is delay tolerant, but may consider it to be a "heavily" or "normally" loaded condition if that traffic is delay sensitive.

One of the numerous advantages of controlling ARQ settings as a function detecting reverse link loading conditions is that such control adjustment does not require Layer 3 (L3) signaling between radio base stations and base station controllers, meaning that the ARQ control adjustments do not incur potentially significant L3 signaling delays. In turn, that means that ARQ control as described herein can be made very dynamic and can easily track even rapidly changing loading conditions within the sector.

Moreover, the loading conditions considered for ARQ control adjustment can include information for sectors beyond the one for which ARQ control adjustments are being made. That is, the ARQ control being used in one sector for one or more mobile stations can be adjusted as a function of reverse link loading conditions in one or more neighboring sectors. In other words, imposing more aggressive ARQ control to reduce interference versus relaxing ARQ control to obtain improved reverse link performance can be based on considering reverse link conditions in more than one sector.

Further, the quantization of reverse link loading into regions encompasses greater flexibility than simply making lightly-loaded or not lightly-loaded characterizations. In other words, potentially many loading thresholds can be used to define a plurality of loading regions and different ARQ control settings can be used in each such region as needed or desired. By way of non-limiting example, one may want to define the number of loading regions equal to the number of subpacket transmissions defined by the nominal ARQ transmission sequence. Thus, for a network with a four-try subpacket transmission sequence, one might define four loading regions with, for example, the heaviest loading region triggering use of the most aggressive ARQ control and the most lightly loaded region triggering use of the most relaxed ARQ control.

With these broad and varied features and advantages in mind, those skilled in the art should appreciate that one or more embodiments of the present invention adjust an ARQ control so that one or more mobile stations transmit data to the network using fewer ARQ transmissions during light reverse link loading conditions. As such, the present invention is not limited by the foregoing discussion, or by the accompanying drawings. Indeed, the present invention is limited only by the following claims and their legal equivalents.

What is claimed is:

1. A method of improving reverse link communication performance in a wireless communication network that uses Automatic Repeat Request (ARQ) control on a reverse link with one or more mobile stations, the method comprising:
    detecting a reverse link loading condition at a network base station as lightly loaded or normally loaded; and
    configuring the ARQ control for the one or more mobile stations according to first ARQ control settings during the normally loaded condition and according to second ARQ control settings during the lightly loaded condition, said second ARQ control settings being configured to reduce ARQ retransmissions by the one or more mobile stations during the lightly loaded condition.

2. The method of claim 1, wherein detecting the reverse link loading condition comprises determining one or more loading metrics including a metric based on the number of mobile stations being supported on the reverse link and a metric based on Quality-of-Service (QoS) constraints associated with one or more of those mobile stations.

3. The method of claim 1, comprising further detecting the reverse link loading condition as very lightly loaded and configuring the ARQ control for the one or more mobile stations according to third ARQ control settings during the very lightly loaded condition, said third ARQ control settings being configured to further reduce ARQ retransmissions by the one or more mobile stations during the very lightly loaded condition.

4. The method of claim 3, wherein detecting the reverse link loading condition as normally loaded, lightly loaded, or very lightly loaded comprises comparing an estimate of reverse link loading to two or more defined loading thresholds.

5. The method of claim 1, wherein detecting a reverse link loading condition as lightly loaded or normally loaded comprises generating an estimate of reverse link loading, determining that the reverse link loading condition corresponds to the normally loaded condition if the estimate of reverse link loading is above a first loading threshold, and determining that the reverse link loading condition corresponds to the lightly loaded condition if the estimate of reverse link loading is below a second loading threshold that is less than or equal to the first loading threshold.

6. The method of claim 1, further comprising hysteretically controlling changing between the first and second ARQ control settings to prevent excessively frequent switching between the first and second ARQ control settings.

7. The method of claim 1, wherein the wireless communication network comprises a Wideband Code Division Multiple Access (W-CDMA) wireless communication network, and wherein a base station control circuit applies the ARQ control to the reverse link in a given radio sector of the W-CDMA network.

8. The method of claim 1, wherein the wireless communication network comprises a cdma2000 wireless communication network, and wherein a base station control circuit applies the ARQ control to the reverse link in a given radio sector of the cdma2000 wireless communication network.

9. The method of claim 1, wherein the first ARQ control settings define one or more reverse link Frame Error Rate (FER) targets and corresponding reverse link outer loop power control settings for an ARQ transmission sequence defined by the ARQ control, and wherein the second ARQ control settings change at least one of the reverse link FER targets or the corresponding reverse link outer loop power control settings to cause the one or more mobile stations to transmit with a relatively higher power earlier in the ARQ transmission sequence.

10. The method of claim 1, wherein the first ARQ control settings set a last transmission in an ARQ transmission sequence defined by the ARQ control as the triggering transmission for adjustment of an outer loop power control target set point used to control mobile station reverse link transmit power, and wherein the second ARQ control settings set one or more earlier transmissions in the ARQ transmission sequence as the triggering transmissions for adjustment of the outer loop power control target set point.

11. The method of claim 1, wherein the first ARQ control settings set one or more Frame Error Rate (FER) targets for one or more transmissions in an ARQ transmission sequence defined by the ARQ control, and wherein the second ARQ control settings lower one or more of those FER targets.

12. The method of claim 11, wherein the second ARQ control settings lower the FER target used for a first or second transmission in the ARQ transmission sequence, such that the one or more mobile stations generally transmit with a higher power for first or second ARQ transmissions than they do when the ARQ control is configured according to the first ARQ control settings.

13. A base station control circuit configured to improve reverse link communication performance in a wireless communication network that uses Automatic Repeat Request (ARQ) control on a reverse link with one or more mobile stations, the base station control circuit comprising one or more processing circuits configured to:
  detect a reverse link loading condition as lightly loaded or normally loaded; and
  configure the ARQ control for the one or more mobile stations according to first ARQ control settings during the normally loaded condition and according to second ARQ control settings during the lightly loaded condition, said second ARQ control settings being configured to reduce ARQ retransmissions by the one or more mobile stations during the lightly loaded condition.

14. The base station control circuit of claim 13, wherein the base station control circuit is further configured to detect the reverse link loading condition as very lightly loaded and configure the ARQ control for the one or more mobile stations according to third ARQ control settings during the very lightly loaded condition, said third ARQ control settings being configured to further reduce ARQ retransmissions by the one or more mobile stations during the very lightly loaded condition.

15. The base station control circuit of claim 14, wherein the base station control circuit includes a loading detection circuit that is configured to detect the reverse link loading condition as normally loaded, lightly loaded, or very lightly loaded by comparing an estimate of reverse link loading to two or more defined loading thresholds.

16. The base station control circuit of claim 13, wherein the base station control circuit includes or is associated with a loading estimation circuit that is configured to generate an estimate of the reverse link loading condition and includes or is associated with a loading detection circuit that is configured to detect the reverse link loading condition based on comparing the estimate of reverse link loading to one or more defined loading thresholds.

17. The base station control circuit of claim 13 wherein the base station control circuit comprises part of a base station controller configured for use in a Wideband Code Division Multiple Access (W-CDMA) wireless communication network.

18. The base station control circuit of claim 13, wherein the base station control circuit comprises part of a base station controller configured for use in a CDMA2000 wireless communication network.

19. The base station control circuit of claim 13, wherein the base station control circuit is configured to configure the ARQ control for each of one or more radio sectors, such that different radio sectors of the wireless communication network can operate with different ARQ control configurations.

20. The base station control circuit of claim 13, wherein the base station control circuit is configured to configure the ARQ control for each of the one or more mobile stations, such that different mobile stations can operate with different ARQ control configurations.

21. The base station control circuit of claim 13, wherein the first ARQ control settings define one or more reverse link Frame Error Rate (FER) targets and corresponding reverse link outer loop power control settings for an ARQ transmission sequence defined by the ARQ control, and wherein the second ARQ control settings change at least one of the reverse link FER targets or the corresponding reverse link outer loop power control settings to cause the one or more mobile stations to transmit with a relatively higher power earlier in the ARQ transmission sequence.

22. The base station control circuit of claim 13, wherein the first ARQ control settings set a last transmission in an ARQ transmission sequence defined by the ARQ control as the triggering transmission for adjustment of an outer loop power control target set point used to control mobile station reverse link transmit power, and wherein the second ARQ control settings set one or more earlier transmissions in the ARQ transmission sequence as the triggering transmissions for adjustment of the outer loop power control target set point.

23. The base station control circuit of claim 13, wherein the first ARQ control settings set one or more Frame Error Rate (FER) targets for one or more transmissions in an ARQ transmission sequence defined by the ARQ control, and wherein the second ARQ control settings lower one or more of those FER targets.

24. The base station control circuit of claim 23, wherein the second ARQ control settings lower the FER target used for a first or second transmission in the ARQ transmission sequence, such that the one or more mobile stations generally transmit with a higher power for first or second ARQ transmissions than when the ARQ control is configured according to the first ARQ control settings.

25. A method of improving the effective reverse link data rate of a mobile station transmitting to a wireless communication network on a reverse link under Automatic Repeat Request (ARQ) control by the network, the method comprising:

detecting at a network base station a reverse link loading condition of a radio sector of the network in which the mobile station is operating; and changing one or more reverse link power control settings used by the ARQ control as a function of the detected reverse link loading condition to reduce ARQ retransmissions by the mobile station during light reverse link loading conditions.

26. The method of claim 25, wherein changing one or more reverse link power control settings used by the ARQ control as a function of the detected reverse link loading condition to reduce ARQ retransmissions by the mobile station during light reverse link loading conditions comprises changing which transmission or transmissions in an ARQ transmission sequence defined by the ARQ control are used for adjusting a target set point associated with controlling a reverse link transmit power of the mobile station.

27. The method of claim 25, wherein changing one or more reverse link power control settings used by the ARQ control as a function of the detected reverse link loading condition to reduce ARQ retransmissions by the mobile station during light reverse link loading conditions comprises changing which transmission or transmissions in an ARQ transmission sequence defined by the ARQ control are used for calculating a Frame Error Rate (FER) for the mobile station's reverse link transmissions.

28. The method of claim 25, wherein changing one or more reverse link power control settings used by the ARQ control as a function of the detected reverse link loading condition to reduce ARQ retransmissions by the mobile station during light reverse link loading conditions comprises changing one or more step sizes corresponding to respective transmissions in a defined ARQ transmission sequence, said one or more step sizes used for adjusting a reverse link power control target.

* * * * *

UNITED STATES PATENT AND TRADEMARK OFFICE
CERTIFICATE OF CORRECTION

| | | |
|---|---|---|
| PATENT NO. | : 7,697,469 B2 | Page 1 of 3 |
| APPLICATION NO. | : 11/018773 | |
| DATED | : April 13, 2010 | |
| INVENTOR(S) | : Wu et al. | |

It is certified that error appears in the above-identified patent and that said Letters Patent is hereby corrected as shown below:

The title page showing the illustrative figure should be deleted and replaced with the attached title page.

In the drawing sheet, consisting of Fig. 1, should be deleted and replaced with the drawing sheet, consisting of Fig. 1, as shown on the attached page.

In Column 7, Line 31, delete "ARO" and insert -- ARQ --, therefor.

Signed and Sealed this
Twenty-third Day of August, 2011

David J. Kappos
*Director of the United States Patent and Trademark Office*

United States Patent
Wu et al.

(12) United States Patent
(10) Patent No.: US 7,697,469 B2
(45) Date of Patent: Apr. 13, 2010

(54) METHOD AND APPARATUS TO IMPROVE COMMUNICATION PERFORMANCE IN ARQ NETWORKS

(75) Inventors: Tao Wu, Carlsbad, CA (US); Wanshi Chen, San Diego, CA (US); Young Yoon, San Diego, CA (US); Jonas Wiorek, San Diego, CA (US); Anthony C. K. Soong, Superior, CO (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1420 days.

(21) Appl. No.: 11/018,773

(22) Filed: Dec. 21, 2004

(65) Prior Publication Data
US 2006/0133268 A1 Jun. 22, 2006

Related U.S. Application Data (60) Provisional application No. 60/570,392, filed on May 12, 2004.

(51) Int. Cl.
*H04J 3/16* (2006.01)
(52) U.S. Cl. ............... 370/328; 370/338; 370/468
(58) Field of Classification Search ............ 370/468, 370/328, 338
See application file for complete search history.

(56) References Cited

U.S. PATENT DOCUMENTS

| | | | |
|---|---|---|---|
| 6,760,303 B1 * | 7/2004 | Brouwer | 370/229 |
| 2002/0028691 A1 | 3/2002 | Moulsley et al. | |
| 2002/0080719 A1 * | 6/2002 | Parkvall et al. | 370/235 |
| 2003/0039227 A1 * | 2/2003 | Kwak | 370/330 |
| 2003/0103483 A1 * | 6/2003 | Joshi et al. | 370/338 |
| 2003/0134642 A1 * | 7/2003 | Kostic et al. | 455/450 |
| 2004/0001456 A1 * | 1/2004 | Chao | 370/328 |
| 2004/0259559 A1 | 12/2004 | Li et al. | |
| 2005/0030964 A1 * | 2/2005 | Tiedemann et al. | 370/431 |
| 2005/0186983 A1 * | 8/2005 | Iochi | 455/522 |
| 2006/0133268 A1 * | 6/2006 | Wu et al. | 370/229 |

FOREIGN PATENT DOCUMENTS

WO   WO 02/082685   10/2002

OTHER PUBLICATIONS

Fairhurst et al, IETF RFC 3366, "Advice to link designers on link Automatic Repeat reQuest (ARQ)", Aug. 2002.*

* cited by examiner

*Primary Examiner*—Seema S Rao
*Assistant Examiner*—Jianye Wu
(74) *Attorney, Agent, or Firm*—Coats & Bennett, P.L.L.C.

(57) ABSTRACT

A wireless communication network improves reverse link communication performance by changing one or more Automatic Repeat Request (ARQ) control settings as a function of measured or estimated reverse link loading. Control settings can be changed on a per-sector basis, allowing consideration of different loading conditions in different radio sectors of the network. Further, control settings can be changed for individual mobile stations, or selected groups of mobile stations, allowing different ARQ controls to be used for different mobile stations. By way of non-limiting example, a control circuit in a base station controller can be configured to take advantage of light reverse link loading conditions in a given radio sector by changing the ARQ control parameter(s) used for one or more mobile stations operating in that sector so that fewer ARQ retransmissions are required for those mobile stations to transmit reverse link data to the network.

28 Claims, 2 Drawing Sheets

FIG. 1